United States Patent
Baugh

(10) Patent No.: US 8,220,325 B2
(45) Date of Patent: Jul. 17, 2012

(54) CURRENT MEASURING METHOD

(76) Inventor: Benton Frederick Baugh, Houston, TX (US)

(*) Notice: Subject to any disclaimer, the term of this patent is extended or adjusted under 35 U.S.C. 154(b) by 449 days.

(21) Appl. No.: 12/460,804

(22) Filed: Jul. 27, 2009

(65) Prior Publication Data

US 2011/0016966 A1   Jan. 27, 2011

(51) Int. Cl.
*G01C 5/00*   (2006.01)
(52) U.S. Cl. .................. 73/170.29; 73/170.31
(58) Field of Classification Search ... 73/170.29–170.34
See application file for complete search history.

(56) References Cited

U.S. PATENT DOCUMENTS

| | | | | |
|---|---|---|---|---|
| 2,019,059 A | * | 10/1935 | Sherman | 405/190 |
| 4,796,238 A | * | 1/1989 | Bourgeois et al. | 367/87 |
| 2011/0202278 A1 | * | 8/2011 | Caute et al. | 702/14 |

* cited by examiner

*Primary Examiner* — Andre Allen

(57) ABSTRACT

The method of measuring the current below an offshore vessel by suspending a flexible member in the currents from the vessel, adding reflectors or signal generators to the flexible member, adding an adjustable weight to the bottom of the flexible member, determining the horizontal position of each reflector in comparison to the reflector above and below it, and using this information to determine the ocean currents at various levels below the vessel.

14 Claims, 1 Drawing Sheet

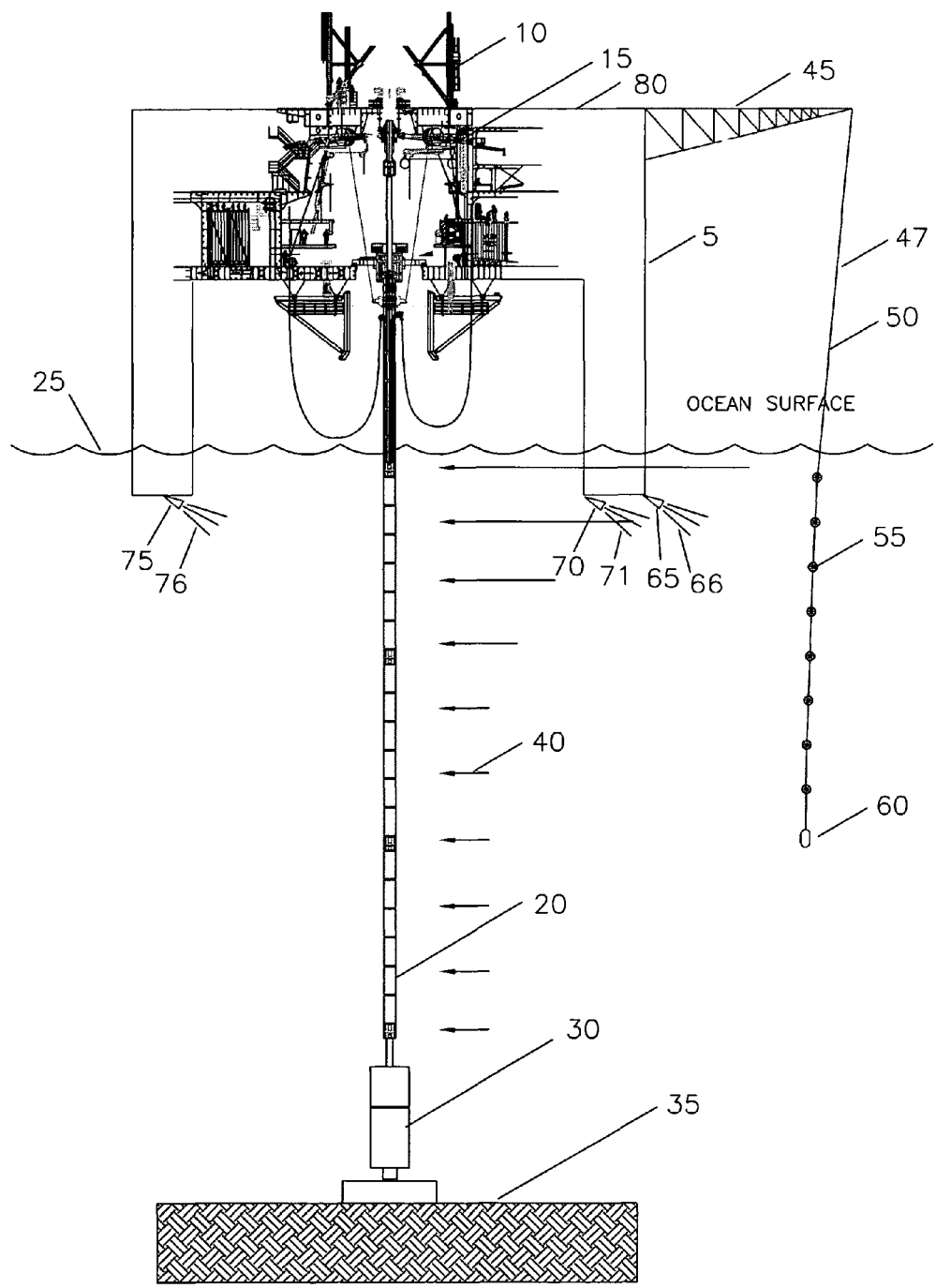

CURRENT MEASURING METHOD

TECHNICAL FIELD

This invention relates to the general subject of monitoring the current in the ocean from a floating vessel

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

Deepwater oil and gas exploration and production projects face many unique challenges that impact associated production facilities and drilling activities. Hurricanes and loop currents rank high on the list of challenges faced during deepwater operations. Hurricane and loop currents shorten the operability envelopes for drilling activity, and shutdown operations. These currents are particularly a problem when the vessel is connected to the ocean floor by a drilling riser. The currents pushing against a typical drilling riser of 52.25" diameter can cause a force of as much as 100,000 lbs. When the riser is released from the ocean floor equipment under this kind of side loadings the resultant movement of the riser can cause the riser to hit parts of the vessel and cause major damage.

An important piece of information to have before releasing the riser from the seafloor for retrieval is the extent of the side force and the direction of the currents. Surface currents can literally be in one direction and the deeper currents can be in the opposite direction. Upon release it is possible for the riser to move in the opposite direction as one would expect based on surface current observations.

Current readings are primarily gathered today by having acoustic instruments focus on bits of trash floating at various depths and inferring the current speed and direction from that acoustinc reading. In a few days the rig operation will learn what the current profile is today. This usually involves the hiring of a vessel to sit near the rig in question to make these readings, at substantial expense.

SUMMARY OF THE INVENTION

The object of this invention is to provide a method for measuring the current at various depths below a stationary offshore vessel.

A second object of this invention is to provide real time information on the currents below aa stationary offshore vessel.

A third object of this invention is to provide an adjustable weight at the lower end of the current measuring device to allow the device to be "tuned" to the current reactions of another object, such as an offshore drilling riser

BRIEF DESCRIPTION OF THE DRAWINGS

FIG. 1 is a view of a semi-submersible drilling facility showing the vessel, the drilling riser, and the current measuring device.

DETAILED DESCRIPTION

Referring now to FIG. 1, a vessel 5 is shown with a part of a drilling mast 10, and several pieces of internal rig equipment 15 shown. Below the rig is a drilling riser 20 penetrating the ocean water surface 25 and attaching to a blowout preventer stack 30 on the seafloor 35.

A current profile 40 is shown and generally inidicates that that the significant currents are in the first 1000' and the currents deeper than 1000' are an inconsequential background current.

Support arm 45 is attached to rig 5 and extends outwards from the rig and supports a sensor assembly 47. A flexible member portion of the sensor assembly 47 such as a hose 50 is attached to support arm 45. At regular spacings, such as 100' spacings, reflectors 55 are attached. Near the bottom of the flexible member a weight 60 is attached. Signal generators at 65, 70 and 75 send signals 66, 71 and 76 respectively towards the reflectors 55 and signal receivers at 65, 70 and 75 receive the signals which are reflected back. By sending and receiving 3 or more signals, computers on board the rig can calculate the horizontal displacement of each of the reflectors.

The simplest case for calculation is with the reflectors 55 being neutrally buoyant, the hose 50 being neutrally buoyant, and a weight 60 on the bottom of the hose 50. In this case the horizontal displacement between each of the reflectors 55 caused by the same current speed will be the same. If the hose and/or reflectors are not neutrally buoyant, the displacement as a function of the current can be estimated, but will require sophisticated flow equations and experimentation. The displacement between various reflectors 55 at adjacent positions will be a function of the hose tension, diameter of the hose, size of the reflector and the velocity of the current.

The preferred embodiment of this method is to have the hose 50 and reflectors 55 as neutrally buoyant, the point of attachment of the hose to the support arm 45 near the same elevation as the rig floor, and the weight 60 adjusted to tune the displacement of the sensor assembly 47 to be the same as the displacement the drilling riser 20 will encounter when released from the blowout preventer stack 30. In this way the electronic calculations from the acoustic measurements will be a fast and readable supply of information, but it if the electronics fail to operate in critical operations, the sensor assembly will provide a visual indication of what will happen when the riser is released.

An alternate embodiment would be for signal generators to be located at each of the levels and broadcast to receivers at locations 65, 70, and 75. These signal generators can be powered down the hose 50 so that the instant of signal generation will be known by the computer systems.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such That which is claimed is:

1. The method of measuring the currents below an offshore vessel comprising:
   providing a flexible member suspended from said offshore vessel,
   attaching a multiplicity of reflectors on said flexible member,
   determining the location of said reflectors using three or more sonar signal generators and sonar signal receivers, and
   determining the current at various subsea depths as a function of the location of said reflectors.

2. The method of claim 1 further comprising said flexible member is a hose.

3. The method of claim 1 further comprising making said flexible member approximately neutrally buoyant.

4. The method of claim 3 further comprising making said reflectors approximately neutrally buoyant.

5. The method of claim 4 further comprising adding a weight to the lower end of said flexible member.

6. The method of claim 5 further comprising said flexible member is a hose.

7. The method of claim 6 further comprising providing said weight with a hollow space inside which can accept gas from within said hose deballast water within said weight to adjust the net weight of said weight.

8. The method of measuring the currents below an offshore vessel comprising:
   providing a flexible member suspended from said offshore vessel,
   attaching a multiplicity of signal generators on said flexible member,
   determining the location of said signal generators using three or more signal receivers, and
   determining the current at various subsea depths as a function of the location of said signal generators.

9. The method of claim 8 further comprising said flexible member is a hose.

10. The method of claim 8 further comprising making said flexible member approximately neutrally buoyant.

11. The method of claim 10 further comprising making said signal generators approximately neutrally buoyant.

12. The method of claim 11 further comprising adding a weight to the lower end of said flexible member.

13. The method of claim 12 further comprising said flexible member is a hose.

14. The method of claim 13 further comprising providing said weight with a hollow space inside which can accept gas from within said hose deballast water within said weight to adjust the net weight of said weight.

* * * * *